US012650978B2

(12) United States Patent  
Kiowski et al.

(10) Patent No.: US 12,650,978 B2  
(45) Date of Patent: Jun. 9, 2026

(54) AGGREGATING UPDATES FOR A DISTRIBUTED DATABASE USING A QUEUE

(71) Applicant: Capital One Services, LLC, McLean, VA (US)

(72) Inventors: Luke Kiowski, Chicago, IL (US); Babu Mannar, Little Elm, TX (US); Venkateshwar Parpelli, Frisco, TX (US); Yang Chen, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/442,351

(22) Filed: Feb. 15, 2024

(65) Prior Publication Data

US 2025/0265241 A1     Aug. 21, 2025

(51) Int. Cl.  
*G06F 16/23* (2019.01)

(52) U.S. Cl.  
CPC .............................. *G06F 16/2386* (2019.01)

(58) Field of Classification Search  
CPC ................................................... G06F 16/2386  
See application file for complete search history.

(56) References Cited

U.S. PATENT DOCUMENTS

| | | | | |
|---|---|---|---|---|
| 11,893,341 | B2* | 2/2024 | Itani | G06F 16/38 |
| 2014/0040182 | A1* | 2/2014 | Gilder | G06F 16/256 |
| | | | | 707/602 |
| 2021/0089533 | A1* | 3/2021 | Chen | G06F 16/24542 |
| 2024/0064563 | A1* | 2/2024 | Demonget | H04W 24/08 |

OTHER PUBLICATIONS

Seymour, Michael, "Real-Time Data Aggregation Using DynamoDB Stream," Jun. 21, 2022, Deliveroo, https://deliveroo.engineering/2022/06/21/dynamodb-aggregation.html.

* cited by examiner

*Primary Examiner* — Aleksandr Kerzhner  
*Assistant Examiner* — Aryan D Toughiry  
(74) *Attorney, Agent, or Firm* — Harrity & Harrity, LLP

(57) ABSTRACT

In some implementations, a device may receive a set of update expressions associated with updating one or more items in the distributed database. The device may store the set of update expressions in an input queue. The device may aggregate, based on a value of a parameter satisfying a threshold, the set of update expressions to obtain aggerated update values for respective items of the one or more items, wherein the aggregated update values are summed values indicated by update expressions, of the set of update expressions, for the respective items of the one or more items. The device may generate, for each item, an aggregated update expression that indicates an aggregated update value, of the aggerated update values, for that item. The device may update the one or more items in the distributed database using the aggregated update expression for each item.

20 Claims, 6 Drawing Sheets

100

145
Generate an aggregated update expression for each item

150
Update the one or more items in the distributed database

Update Management Device

155
Aggregated update expression(s)

160
Update the one or more items using the aggregated update values

Distributed Database

AGGREGATING UPDATES FOR A DISTRIBUTED DATABASE USING A QUEUE

BACKGROUND

Cloud computing refers to network-based on-demand availability of computer system resources, such as data storage and computing power. Cloud computing providers typically offer service according to different service models, including Infrastructure as a Service (IaaS), Platform as a Service (PaaS), and Software as a Service (SaaS). In some examples, a cloud environment may include distributed databases to enable scalable and resilient data storage in the cloud environment. A distributed database may use horizontal scaling, fault tolerance, data replication across deployment zones (e.g., regions), and seamless cloud integration to enable efficient and reliable solutions for dynamic and scalable data management.

SUMMARY

Some implementations described herein relate to a system for aggregating updates for a distributed database. The system may include one or more memories and one or more processors communicatively coupled to the one or more memories. The one or more processors may be configured to receive a set of input messages associated with updating one or more items in the distributed database, wherein the distributed database is a not only structured query language (NoSQL) database, and wherein the set of input messages include respective update expressions for the distributed database. The one or more processors may be configured to store the set of input messages in an input queue. The one or more processors may be configured to aggregate, based on a value of a batch parameter satisfying a threshold, the set of input messages to obtain aggerated update values for respective items of the one or more items, wherein the aggregated update values are summed values indicated by input messages, of the set of input messages, for the respective items of the one or more items. The one or more processors may be configured to generate, for each item, an update expression that indicates an aggregated update value for that item. The one or more processors may be configured to update, using the update expression for each item, the one or more items in the distributed database.

Some implementations described herein relate to a method for aggregating updates for a distributed database. The method may include receiving, by a device, a set of update expressions associated with updating one or more items in the distributed database. The method may include storing, by the device, the set of update expressions in an input queue. The method may include aggregating, by the device and based on a value of a parameter satisfying a threshold, the set of update expressions to obtain aggerated update values for respective items of the one or more items, wherein the aggregated update values are summed values indicated by update expressions, of the set of update expressions, for the respective items of the one or more items. The method may include generating, by the device and for each item, an aggregated update expression that indicates an aggregated update value, of the aggerated update values, for that item. The method may include updating, by the device, the one or more items in the distributed database using the aggregated update expression for each item.

Some implementations described herein relate to a non-transitory computer-readable medium that stores a set of instructions. The set of instructions, when executed by one or more processors of a device, may cause the device to provide, to an input queue, input messages associated with updating one or more items in a distributed database, wherein the input messages include respective update expressions for the distributed database. The set of instructions, when executed by one or more processors of the device, may cause the device to provide, from the input queue and based on a value of a batch parameter satisfying a threshold, a set of input messages to an aggregation component configured to obtain aggerated update values for respective items of the one or more items. The set of instructions, when executed by one or more processors of the device, may cause the device to obtain, from the aggregation component and for each item, an update expression that indicates an aggregated update value for that item. The set of instructions, when executed by one or more processors of the device, may cause the device to update, using the update expression for each item, the one or more items in the distributed database.

DETAILED DESCRIPTION

Figure 1A:
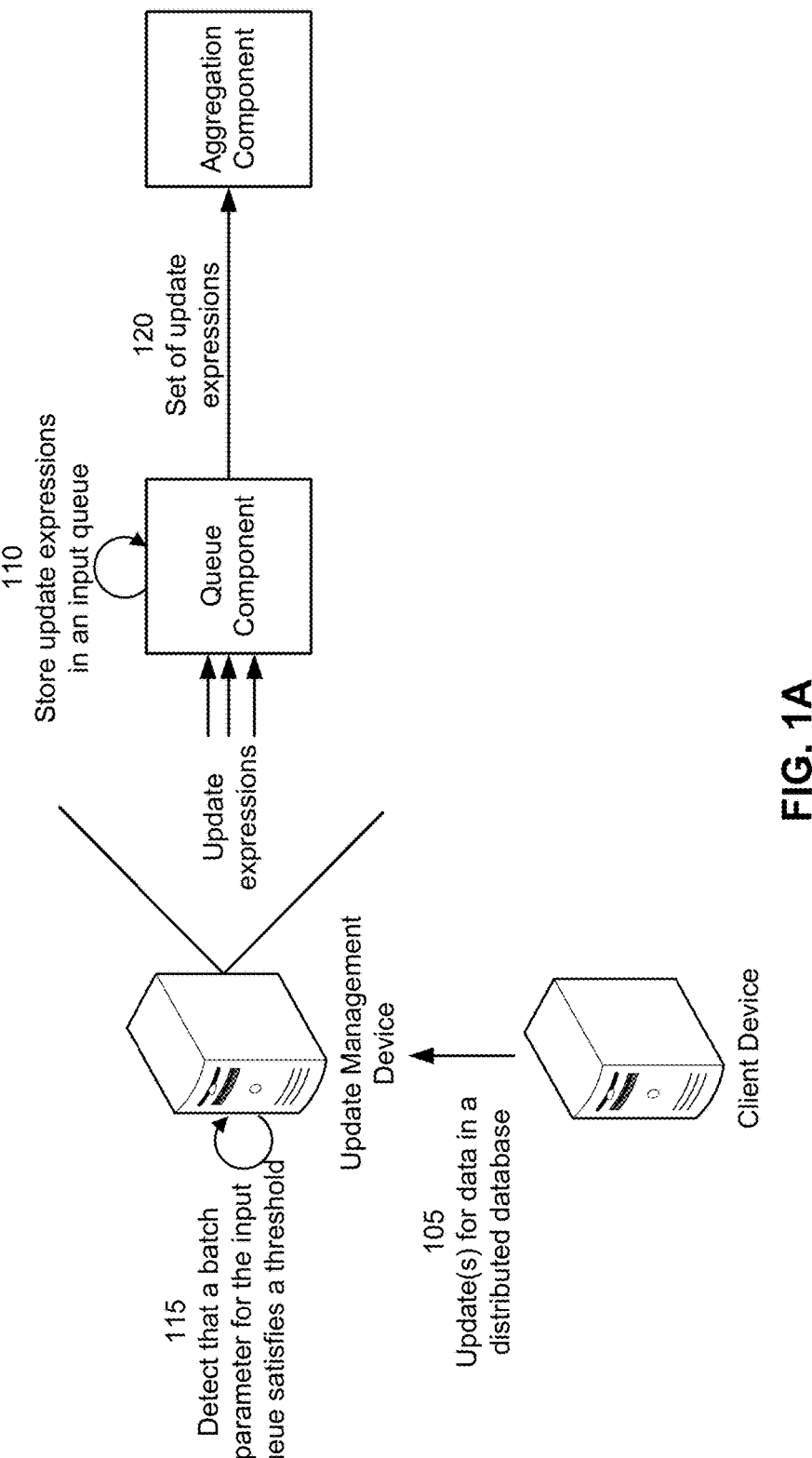
FIGS. 1A-1C are diagrams of an example associated with aggregating updates for a distributed database using a queue, in accordance with some embodiments of the present disclosure.

The following detailed description of example implementations refers to the accompanying drawings. The same reference numbers in different drawings may identify the same or similar elements.

A distributed database is a database in which data is stored across different physical locations. A distributed database may be stored in multiple devices located in the same physical location (e.g. a data center) or maybe dispersed over a network of interconnected devices or nodes (e.g., in a cloud computing environment). A cloud database may be a distributed database that executes on a cloud computing environment and enables access to the database via a service. A distributed database in a cloud computing environment may be structured query language (SQL)-based or may be not only SQL (NoSQL)-based (sometimes referred to as non-SQL or non-relational). A NoSQL database may store data within one data structure in a non-relational manner. Because a NoSQL database may not require a schema, the NoSQL database may enable scalability and improved performed for large unstructured data sets.

A distributed database in a cloud computing environment may include a table. The table may be a main data storage unit in the distributed database. The distributed database may include one or more items. An item may be a collection of one or more attributes that represent a single data record in a table (similar to a row in a typical relational database).

Each item may have varying quantities of attributes (and the attributes may be different for each item in a given table). An attribute may be a data element within an item. Each attribute may be associated with a key-value pair (e.g., where the key is an attribute name and the value is the data associated with that attribute). An attribute may have various data types, such as a string, a number, binary data, a set, a list, a map, and/or another data type.

In some examples, data stored in a database (e.g., a NoSQL database) may be updated or modified. For example, to update data in the database, a device may provide an update expression to the database. The update expression may use keywords (such as set, remove, or add) that indicate or define the modification(s) to be performed. For example, the keyword(s) may indicate that an attribute is to be updated, added, deleted, and/or incremented (e.g., for numeric values), among other examples. An update expression may indicate a key value of an item and/or attribute to be updated. In some examples, the database may be associated with one or more throughput limits to enable controlled resource consumption, fair access to database resources, and predictable and/or consistent performance for multiple distributed users. For example, the throughput limits may ensure that a disproportionate amount of traffic is not directed to a small subset of physical storage nodes, reducing the likelihood of performance bottlenecks. For example, the database may define that throughput limits for respective partitions (e.g., a partition may define a physical storage node in which data is stored).

In some examples, the database may receive frequent update expressions for the same item or attribute (e.g., for the same key value). The frequent updates for the same item or attribute may cause a throughput of a partition to approach the throughput limit for the partition. To ensure that the throughput limit is not exceeded, the database may limit the quantity of updates and/or the rate at which updates can be made for the partition (e.g., the database may throttle updates made to the partition). The throttling may include temporary rejections of update expressions and/or delays of update expressions. The throttling may negatively impact the performance of devices attempting to perform the updates. For example, the throttling may cause increased latency, reduced throughput, inconsistent performance, operational challenges, and/or a negative user experience, among other examples.

Additionally, in some examples, multiple components (e.g., multiple sources, multiple devices, or multiple execution threads) may attempt to update the same item in the distributed database at approximately the same time. This may result in an update made by a second component overwriting an update made by a first component. This may reduce an accuracy, reliability, and/or precision of the data stored in the item of the distributed database.

Some implementations described herein enable aggregated updates for a distributed database using a queue. For example, an update management device may use queues in addition to an aggregation function for updating a distributed database. For example, the update management device may provide update expressions to a queue to be stored (e.g., before the update expressions are provided to the distributed database). The update expressions may be collected and/or stored in the queue until one or more batch parameters are met or a threshold is satisfied. If the one or more batch parameters are met or a threshold is satisfied, then an aggregation component may aggregate the update expressions currently stored in the queue by key value. For example, the aggregation component may sort the update expressions by key value (e.g., by item and/or attribute) and sum values indicated by the update expression(s) to generate a single update value for each item or attributed referenced by the update expressions. The update management device (e.g., the aggregation component) may generate a single update expression for the distributed database for each item or attribute (e.g., for each key value) using the summed update values. The single update expression may be provided to the distributed database to cause an update to be made to each item or attribute (e.g., each key value) that captures an aggregated update for the update expressions that were stored in the queue.

In some examples, aggregation of data in the distributed database may be accomplished via a queue by storing updated data in the queue and sorting and/or aggregating the data to generate an aggregated update (e.g., for improved readability or understanding of the data). However, the data may be updated in the distributed database before aggregation, which may still result in the throttling issues described herein. Here, by storing the update expressions in the queue and aggregating the update expressions prior to updating or communicating with the distributed database, the update management device may reduce the quantity of updates made to the distributed database while still capturing changes made by multiple update expressions provided for the distributed database. As a result, the update management device may maintain throughput, latency, and/or performance for updates to the distributed database when there are frequent updates to the same item, attribute, and/or partition of the distributed database with a reduced risk of a throughput limit being met and/or with a reduced risk of throttling by the distributed database. For example, the combination of queuing and aggregation may enable a single update expression to capture all updates requested by multiple update expressions. Additionally, by using the batch parameter(s) to trigger the aggregation, the update management device may improve latency and/or throughput for the updates to the distributed database when there are frequent updates to the same item, attribute, and/or partition of the distributed database (e.g., where the frequent updates may have otherwise resulted in throttling by the distributed database).

Further, the combination of queuing and aggregation may enable a single update expression to capture all updates requested by multiple update expressions ensures a high level of precision is maintained for the update(s) made to the distributed database. For example, by queuing and aggregating the update expressions (e.g., before providing the update expressions to the distributed database), the techniques and implementations described herein ensure that there is a single source for the updates to the item(s) in the distributed database. This may reduce a likelihood of contention by multiple sources (e.g., multiple execution threads or multiple applications) attempting to update the same item in the distributed database at the same time. By ensuring that there is a single source for the updates made to a given item, a precision and/or reliability of the updates made to the given item may be improved.

Figure 1B:
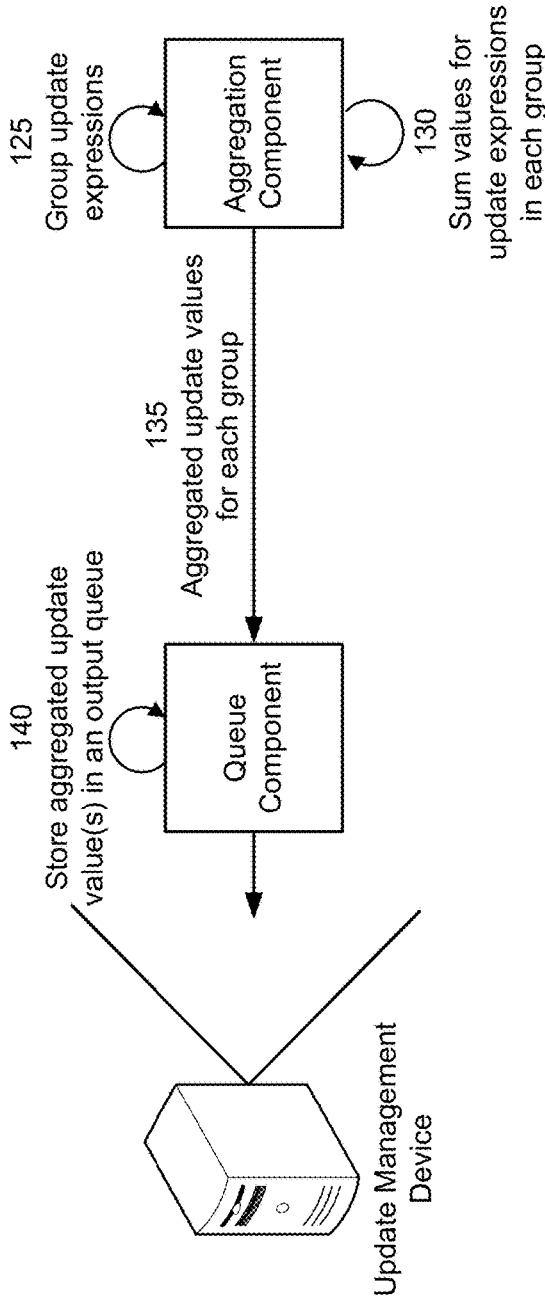
Figure 1C:
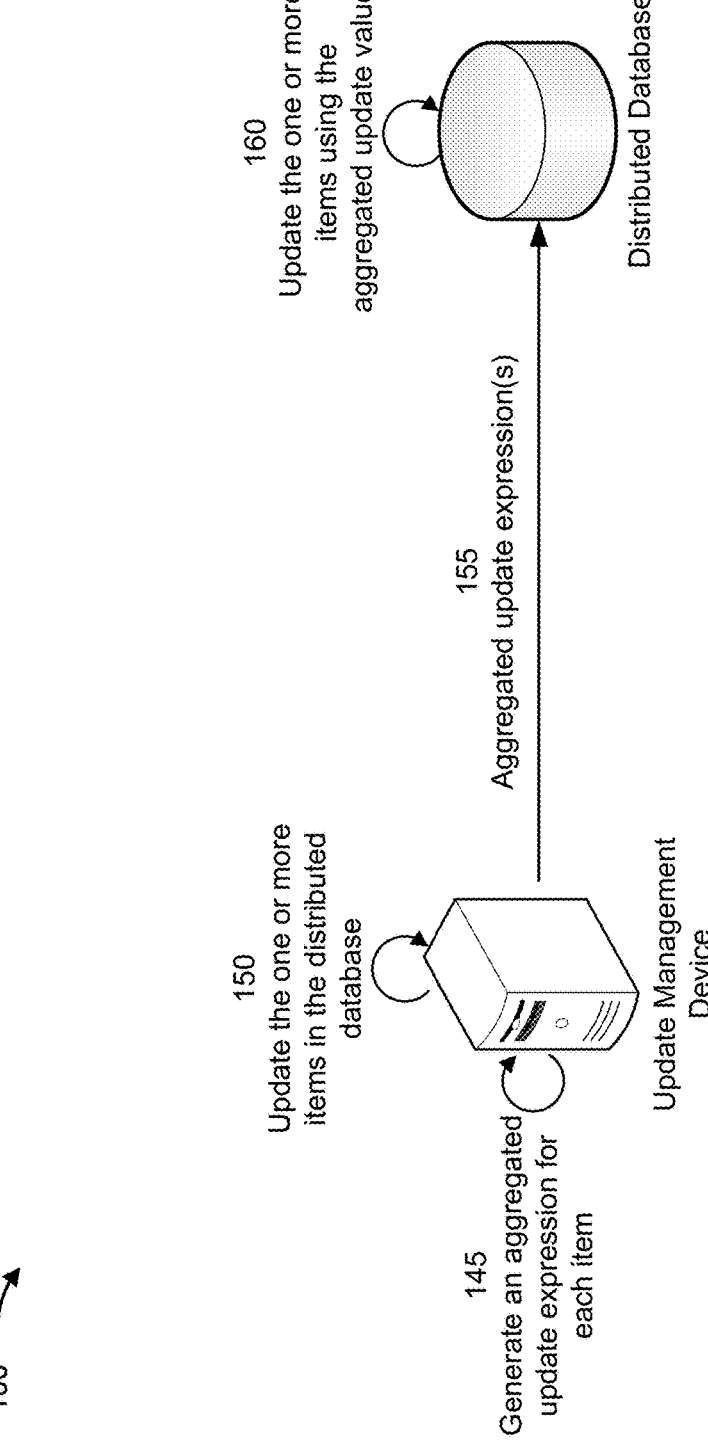

FIGS. 1A-1C are diagrams of an example 100 associated with aggregating updates for a distributed database using a queue. As shown in FIGS. 1A-1C, example 100 includes an update management device, a client device, a distributed database, a queue component, and an aggregation component. These devices are described in more detail in connection with FIGS. 2 and 3.

As shown in FIG. 1A, and by reference number 105, the client device may provide (e.g., transmit), and the update management device may obtain (e.g., receive), an indication of one or more updates for data in a distributed database. For example, the client device may obtain (e.g., via user input) an indication of the one or more updates. As another example, an application executing on the client device may generate or provide the one or more updates.

The indication of the one or more updates may include update expressions for respective updates to data in the distributed database. For example, the client device may transmit, and the update management device may receive, a set of update expressions (e.g., one or more update expressions) associated with updating data (e.g., one or more items or attributes) in the distributed database. An update expression may also be referred to as an update item operation. An update expression may define one or more updates to data for an item stored via the distributed database. For example, an update expression may indicate a set operation (e.g., for modifying or adding item attributes), a remove operation (e.g., for deleting attributes from an item), an add attribute (e.g., for updating numbers and sets), and/or a delete operation (e.g., for removing elements from a set), among other examples. In some implementations, the update(s) (e.g., the update expressions) provided by the client device may indicate increments (or decrements) of a value stored in the distributed database. For example, the update(s) may be modifications to a current value in the distributed database, where the modification increments or decrements the current value. For example, the update expressions may be associated with an increment or decrement of a current value of one or more items stored in the distributed database. In other words, the update expressions may be associated with a modification of current values of respective items stored in the distributed database.

A given update expression may indicate an identifier of the data to be updated as defined by the given update expression. For example, the identifier may include a key value corresponding to an item (or attribute) identifying where the data is stored (e.g., in the distributed database). In some implementations, the identifier may indicate a storage location (e.g., a table, a partition, an item, an attribute, a row, and/or a column) within the distributed database where the data to be updated is stored.

As shown by reference number 110, the update management device may store the update expressions in an input queue of the queue component. As described elsewhere herein, the queue component may be configured to receive, store, and/or transmit data to one or more components in a cloud computing environment. The queue component may include an input queue (e.g. for storing received update expressions) and an output queue (e.g., for storing aggregated update expressions, as described in more detail elsewhere herein). In some implementations, the queue component may be configured to provide a queuing service. The queuing service may be a message queuing service. For example, the queue component may be configured to provide a distributed message queuing service. As an example, the queue component may be configured to provide the SIMPLE QUEUE SERVICE (SQS) (e.g., provided via AMAZON WEB SERVICES).

For example, the update management device may receive a set of input messages associated with updating one or more items in the distributed database, where the set of input messages include respective update expressions for the distributed database. In some implementations, the update management device may generate the set of input messages (e.g., to be provided to the queue component) based on the update expressions received from the client device (or from multiple client devices). The update management device may provide the set of input messages to the queue component to be stored in the input queue. The update management device (e.g., via the queue component) may store the set of input messages in the input queue.

The update management device may continue to provide and/or store input messages (e.g., indications of update(s) to data in the distributed database) in the input queue over time. For example, when an indication of an update (e.g., via an update expression) is obtained by the update management device, the update management device may provide the indication of the update (e.g., via an input message) to the input queue for storage or queuing before being provided to the distributed database.

As shown by reference number 115, the update management device (and/or the queue component) may detect that a batch parameter for the input queue satisfies a threshold or is met. The batch parameter may be any parameter indicating that updates (e.g., update expressions) stored in the input queue are to be aggregated. In some implementations, the batch parameter may include a quantity of the set of input messages stored in the input queue. For example, the update management device (and/or the queue component) detecting that the batch parameter for the input queue satisfies a threshold or is met may include determining that the quantity of input messages (or update expressions) stored in the input queue is greater than or equal to a batch threshold.

As another example, the batch parameter may include an amount of time that the set of input messages have been stored in the input queue. For example, the update management device (and/or the queue component) detecting that the batch parameter for the input queue satisfies a threshold or is met may include determining that an amount of time that a given input message has been stored in the input queue is greater than or equal to a first time threshold. As another example, the batch parameter may include an amount of time since a previous aggregation operation has been performed. For example, the update management device (and/or the queue component) detecting that the batch parameter for the input queue satisfies a threshold or is met may include determining that amount of time since the most recent aggregation operation was performed is greater than or equal to a second time threshold. For example, the update management device (and/or the queue component) may aggregate the input messages (e.g., the update expressions) after N input messages are stored in the queue and/or every M minutes, as described in more detail elsewhere herein. The batch parameter(s) may ensure that latency associated with performing the update(s) to the database is not significantly increased due to the queuing of the updates.

As shown by reference number 120, the queue component may provide, and the aggregation component may obtain, the set of update expressions (e.g., stored in the input queue). For example, the queue component may be triggered to provide input messages stored in the input queue based on, in response to, or otherwise associated with the batch parameter(s) satisfying a threshold or being met. In some implementations, the aggregation component may be a serverless function that is triggered to obtain the input messages stored in the input queue based on, in response to, or otherwise associated with the batch parameter(s) satisfying a threshold or being met. For example, the queue component (or the update management component) may provide, from the input queue, a set of input messages to a serverless function (e.g., an anonymous function or a Lambda function) that is configured to aggregate the set of input messages, as described in more detail elsewhere herein.

For example, a cloud computing environment may include a serverless framework The serverless framework may use one or more serverless functions to perform tasks (such as aggregating the update expression, as described herein). A serverless function may be code that runs in the cloud computing environment and is executed in response to a specific trigger or event (e.g., the batch parameter(s) satisfying a threshold or being met). A serverless function may be referred to interchangeably herein as a lambda function and/or an anonymous function. The serverless function may be stateless, meaning that the serverless function does not retain any data or state between invocations. This allows the serverless function to scale horizontally and be triggered multiple times concurrently without interference.

Additionally, the serverless function may be managed by a cloud provider associated with the cloud computing environment. Therefore, developers (e.g., associated with developing the task or service) may not need to provision or maintain servers or infrastructure associated with performing the task or service. Instead, the developers can simply upload code and configure the triggers and events that will invoke the serverless function and the cloud provider may handle provisioning resources and infrastructure associated with executing the code via the serverless function. A given serverless function may be referred to as an instance of a serverless function. Serverless functions may be cost effective because the developers may only be charged (e.g., for use by the cloud provider) for the duration of the function execution and will not incur any charges when serverless functions are not running. This makes serverless functions well-suited for applications that require frequent, short-duration executions, such as image or video processing, data stream processing, and/or real-time data analysis, among other examples.

When using a serverless framework, developers may write code that runs in response to specific events, such as incoming application programming interface (API) requests (e.g., calls) or changes in data storage. The cloud provider may be responsible for running and scaling the code, as well as providing the necessary resources and/or infrastructure, such as memory and computing power, among other examples. Because serverless frameworks may only charge for the specific resources and computing time used, a serverless framework can be a cost-effective solution for applications that have unpredictable workloads or experience sudden spikes in traffic (e.g., a cloud provider only charges an entity for the cloud resources actually used). Additionally, serverless frameworks also provide built-in high availability and auto-scaling capabilities, so a task can automatically scale up or down based on the number of requests associated with the take, which can help ensure that the task is always available and responsive. In other examples, the aggregation component may be a different cloud component, such as a container or a virtual machine, among other examples.

As shown in FIG. 1B, and by reference number 125, the aggregation component may group the update expressions. For example, the aggregation component may group or sort the update expressions by the data to be updated by respective update expressions. In other words, the aggregation component may group update expressions that indicate the same data (e.g., the same item or attribute) together.

In some implementations, the aggregation component may filter the input messages (e.g., indicating respective update expressions) using an identifier of the data to be updated. For example, the aggregation component may group the set of input messages into groups associated with respective items of one or more items indicated by the set of update expressions (e.g., the set of input messages) provided to the aggregation component. The aggregation component may group the set of update expressions (e.g., the set of input messages) provided to the aggregation component using keys indicated by respective update expressions (e.g., the identifier of the data to be updated may be a key value). The groups may include update expressions for respective keys, respective items, and/or for respective attributes associated with the distributed database. For example, the aggregation component may group the set of update expressions into groups for respective keys (e.g., into groups associated with respective items or respective attributes).

The aggregation component may aggregate the set of update expressions based on grouping the set of update expressions. For example, the aggregation component may generate a single aggregated update expression for each group. The update expression(s) generated by the aggregation component may be a single update expression for each item that indicates the aggregated update value for that item. In some other implementations, the aggregation component may generate an aggregated update value for each group and another component (e.g., the update management device) may generate an update expression using the aggregated update value.

For example, as shown by reference number 130, the aggregation component may sum values for update expressions in each group. In other words, the aggregation component may sum, for each group, values indicated by update expressions (e.g., the input messages) included in that group to obtain an aggregated update value for that group. The aggregated updated value may be a summed updated value representing a collective (or aggregated) update for each update expression included in a given group. For example, the aggregation component may sum, for each group, values indicated by one or more update expressions included in that group to obtain an aggregated value for that group. In this way, the aggregation component may aggregate updates made to the same data (e.g., the same item and/or the same attribute in the distributed database) and generate an aggregated update value for that data (e.g., before any modifications are made to the data as stored in the distributed database).

As an example, the update expressions in a given group may be associated with modifications to a current value of an item or attribute in the distributed database (e.g., may be increments or decrements of the current value). As an example, the update expressions may indicate an update value by which the current value of the item or attribute in the distributed database is to be updated. The aggregation component may aggregate (e.g., sum) the update values for each update expression included in a given group to obtain an aggregated update value for the given group.

As another example, the update expressions in a given group may be associated with adding one or more attributes to an item in the distributed database (e.g., a set action). In such examples, the aggregation component may identify each attribute to be added to the item. If multiple update expressions indicate the same attribute, then the aggregation component may set a value of the attribute as indicated by an update expression that arrived at the input queue last in time (e.g., the last update expression may set the value of the attribute). The aggregation component may aggregate each attribute (and a corresponding value) to be added to the item (e.g., a given group may include all update expressions for the item). For example, the aggregation component may generate an aggregated update that indicates each attribute (and a corresponding value or function, such as a list append function, or another function) to be added, removed, or modified for a given item.

As shown by reference number 135, the aggregation component may provide, and the queue component may obtain, aggregated update values for each group. For example, the aggregation component may provide aggregated update values for respective groups of one or more groups generated by the aggregation component. The aggregation component may provide an indication of an aggregated update value and a key, item, or attribute that is associated with the aggregated update value. As described elsewhere herein, the aggregated update value may be a summed value or may be an expression that indicates each attribute (and a corresponding value or function, such as a list append function, or another function) to be added, removed, or modified for a given item. In some implementations, the aggregation component may provide, and the queue component may obtain, an aggregated update expressions for respective groups, items, or attributes.

For example, the aggregation component (and/or the update management component) may provide the aggregated update value for each item to an output queue (e.g., aggregated update values for respective items). The aggregated update values may be stored in an output queue of the queue component (e.g., to be provided to the update management component and/or to the distributed database). For example, as shown by reference number 140, the queue component may store one or more aggregated update values in an output queue. The one or more aggregated update values may indicate respective items (e.g., keys) that identify the data to which the one or more aggregated update values are to be applied.

As shown in FIG. 1C, and by reference number 145, the update management device may generate an aggregated update expression for each item, key, or attribute indicated by the output queue. For example, the update management device may obtain an aggregated update value for a given item (e.g., via the output queue). The update management device may use the aggregate update value to generate an update expression for the given item (e.g., that indicates the aggregated update value). This enables the update management device to generate an update expression that can be used to update the distributed database that leverages the aggregated information generated by the aggregation component.

As shown by reference number 150, the update management device may update one or more items in the distributed database (e.g., using an aggregated update expression). For example, as shown by reference number 155, the update management device may provide or transmit, and the distributed database may obtain or receive, one or more aggregated update expressions for respective items (e.g., for respective keys). As an example, the update management device may provide a single update expression for a given item that indicates an aggregated update value capturing update from multiple update expressions for the given item (e.g., provided to the input queue via one or more client devices).

As shown by reference number 160, the distributed database may update the one or more items using the aggregated update values indicated by respective aggregated update expressions. For example, the distributed database may perform an operation for an item based on, in response to, or otherwise associated with obtaining an aggregated update expressions that identifies that item. For example, the aggregated update expression may indicate an aggregated update value for one or more attributes stored in the item, where the aggregated update value is a summed value from multiple update expressions.

By storing the multiple update expressions in the input queue and aggregating the multiple update expressions prior to updating or communicating with the distributed database, the update management device may reduce the quantity of updates made to the distributed database while still capturing changing made by multiple update expressions provided for the distributed database (e.g., a single update expression may be provided to the distributed database that accurately, correctly, and reliably captures updates made by multiple update expressions). As a result, the update management device may maintain throughput, latency, and/or performance for updates to the distributed database when there are frequent updates to the same item, attribute, and/or partition of the distributed database with a reduced risk of a throughput limit being met and/or with a reduced risk of throttling by the distributed database. For example, the combination of queuing and aggregation may enable a single update expression to capture all updates requested by multiple update expressions. Additionally, by using the batch parameter(s) to trigger the aggregation, the update management device may improve latency and/or throughput for the updates to the distributed database when there are frequent updates to the same item, attribute, and/or partition of the distributed database (e.g., where the frequent updates may have otherwise resulted in throttling by the distributed database).

As indicated above, FIGS. 1A-1C are provided as an example. Other examples may differ from what is described with regard to FIGS. 1A-1C.

Figure 2:
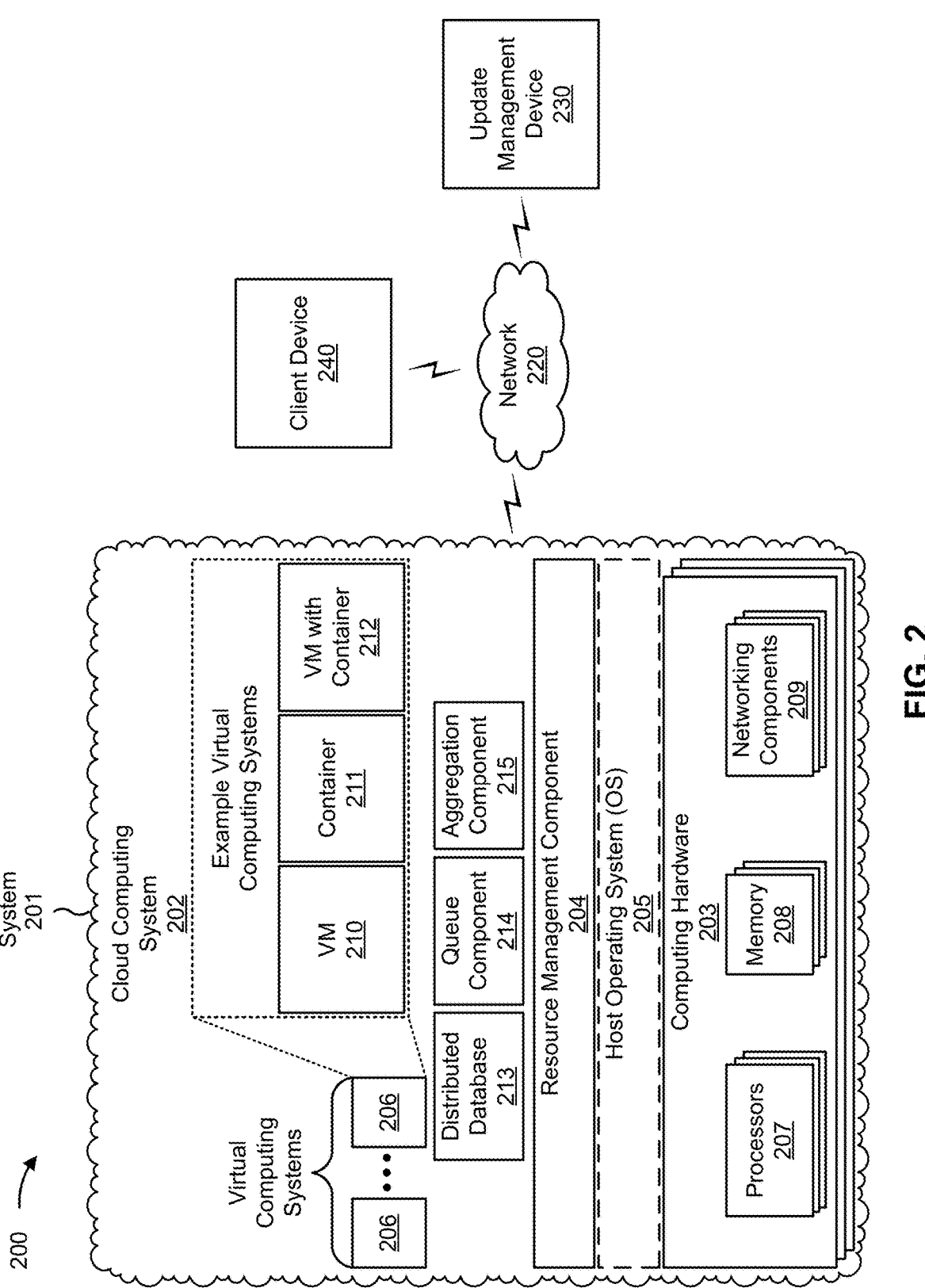
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a system 201, which may include one or more elements of and/or may execute within a cloud computing system 202. The cloud computing system 202 may include one or more elements 203-215, as described in more detail below. As further shown in FIG. 2, environment 200 may include a network 220, an update management device 230, and/or a client device 240. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

The cloud computing system 202 may include the distributed database 213. The distributed database 213 may include a communication device and/or a computing device. For example, the distributed database 213 may include a data structure, a database, a data source, a server, a database server, an application server, a client server, a web server, a host server, a proxy server, a virtual server (e.g., executing on computing hardware), a server in a cloud computing system, a device that includes computing hardware used in the cloud computing system 202, or a similar type of device. The distributed database 213 may include an NoSQL database (e.g., a non-relational database) and/or an SQL database (e.g., a relational database). In some examples, the distributed database 213 may be accessible via different instances, deployments, and/or regions, among other examples, of the cloud computing system 202. For example, copies of the distributed database 213 may be executing and/or accessible in respective deployment zones (e.g., geographic deployment regions) of the cloud computing system 202.

The cloud computing system 202 may include the queue component 214 and the aggregation component 215. The queue component 214 may be configured to provide a distributed queue service, such as a distributed message queuing service. For example, the queue component 214 may be configured to receive, store, and/or transmit, among other examples, messages between components of the cloud computing system 202 (and/or components outside of the cloud computing system 202). The aggregation component 215 may be configured to aggregate update values for update expressions stored in the queue component 214, as described in more detail elsewhere herein. The aggregation component 215 may include a virtual machine (VM) 210, a container 211, a hybrid environment 212, a serverless function (e.g., a Lambda function), and/or another cloud computing component configured to aggregate the update values.

Although the system 201 may include one or more elements 203-215 of the cloud computing system 202, may execute within the cloud computing system 202, and/or may be hosted within the cloud computing system 202, in some implementations, the system 201 may not be cloud-based (e.g., may be implemented outside of a cloud computing system) or may be partially cloud-based. For example, the system 201 may include one or more devices that are not part of the cloud computing system 202, such as device 300 of FIG. 3, which may include a standalone server or another type of computing device. The system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The update management device 230 may include one or more devices capable of receiving, generating, storing, processing, providing, and/or routing information associated with aggregating updates for a distributed database using a queue (e.g., using the queue component 214 and/or the aggregation component 215), as described elsewhere herein. The update management device 230 may include a communication device and/or a computing device. For example, the update management device 230 may include a server, such as an application server, a client server, a web server, a database server, a host server, a proxy server, a virtual server (e.g., executing on computing hardware), or a server in a cloud computing system. In some implementations, the update management device 230 may include computing hardware used in the cloud computing system 202. In some examples, the update management device 230 may be included in the cloud computing system 202. In other examples, the update management device 230 may be separate from the cloud computing system 202 or may be included in a different cloud computing system. The update management device 230 may be configured to manage, control, and/or configure, among other examples, the queue component 214 and/or the aggregation component 215. In some examples, the queue component 214 and the aggregation component 215 may be included in the update management device 230.

The client device 240 may include one or more devices capable of receiving, generating, storing, processing, and/or providing information associated with aggregating updates for a distributed database using a queue (e.g., using the queue component 214 and/or the aggregation component 215), as described elsewhere herein. For example, the client device 240 may be configured to provide update expressions for updating data stored in the distributed database 213. The client device 240 may include a communication device and/or a computing device. For example, the client device 240 may include an application executing on the client device 240, a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
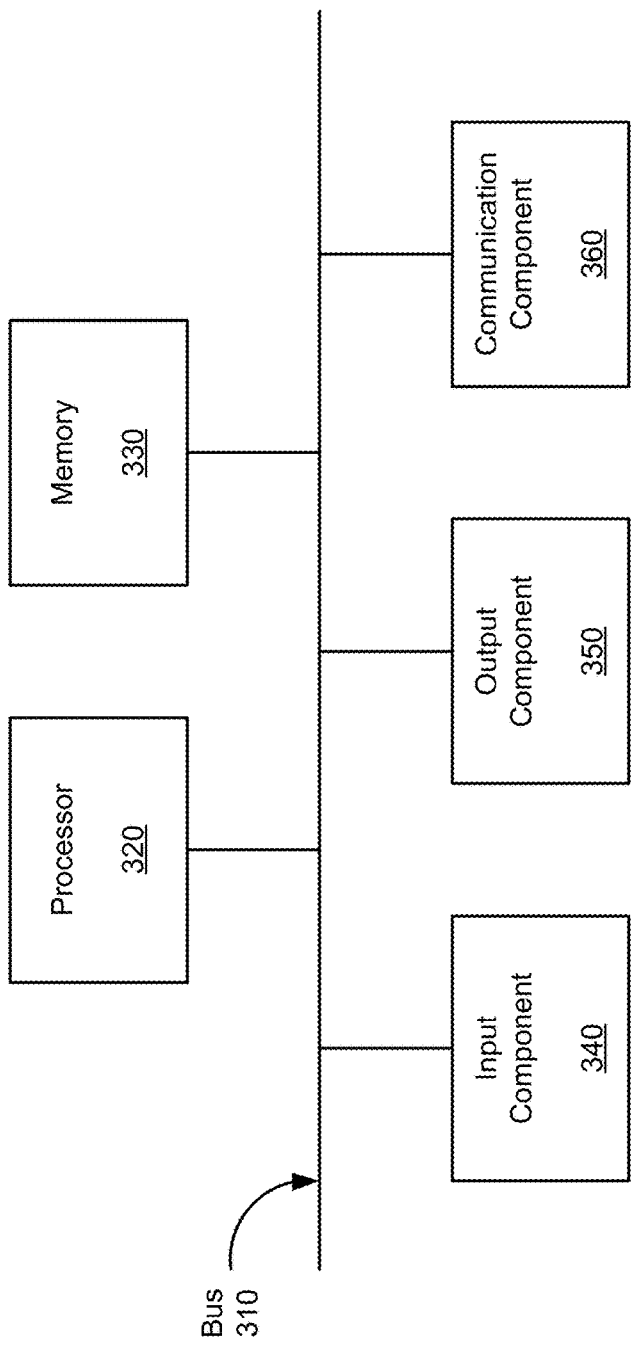
FIG. 3 is a diagram of example components of a device associated with aggregating updates for a distributed database using a queue, in accordance with some embodiments of the present disclosure.

FIG. 3 is a diagram of example components of a device 300 associated with aggregating updates for a distributed database using a queue. The device 300 may correspond to a component in the cloud computing system 202 (e.g., the distributed database 213, the queue component 214, and/or the aggregation component 215), the update management device 230, and/or the client device 240, among other examples. In some implementations, a component in the cloud computing system 202 (e.g., the distributed database 213, the queue component 214, and/or the aggregation component 215), the update management device 230, and/or the client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
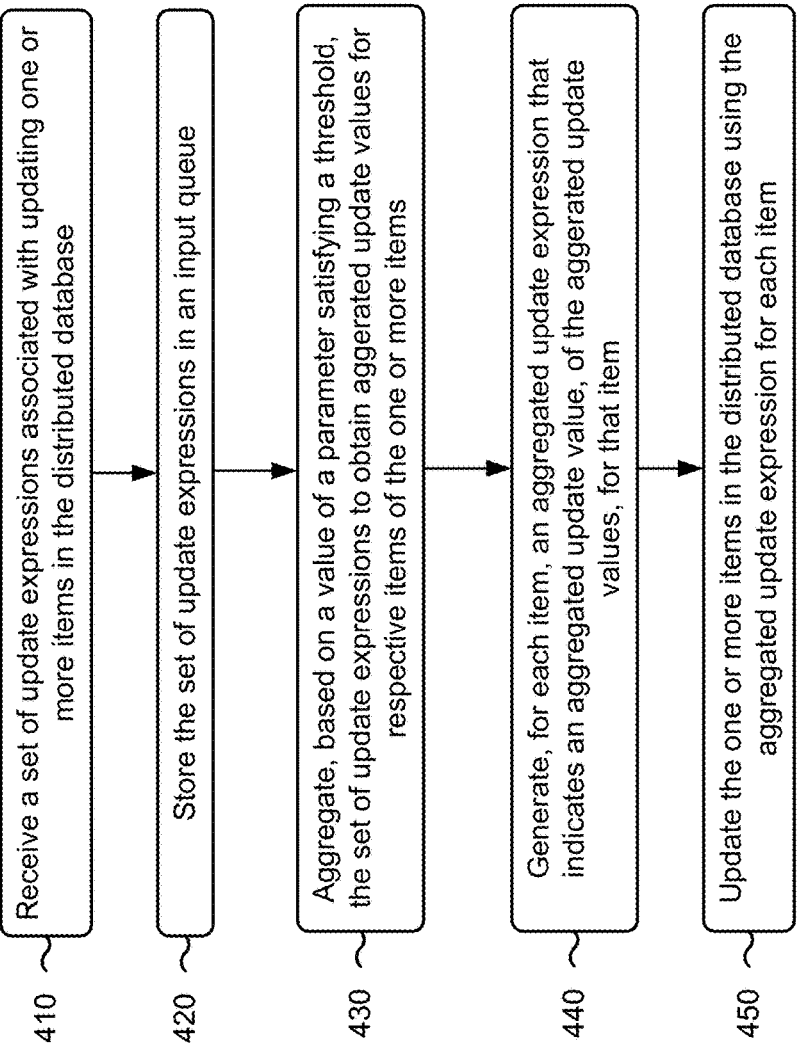
FIG. 4 is a flowchart of an example process associated with aggregating updates for a distributed database using a queue, in accordance with some embodiments of the present disclosure.

FIG. 4 is a flowchart of an example process 400 associated with aggregating updates for a distributed database using a queue. In some implementations, one or more process blocks of FIG. 4 may be performed by the update management device 230. In some implementations, one or more process blocks of FIG. 4 may be performed by another device or a group of devices separate from or including the update management device 230, such as the system 201, the cloud computing system 202 (and/or a component of the cloud computing system 202), the distributed database 213, the queue component 214, the aggregation component 215, and/or the client device 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a set of update expressions associated with updating one or more items in the distributed database (block 410). For example, the update management device 230 (e.g., using processor 320, memory 330, input component 340, and/or communication component 360) may receive a set of update expressions associated with updating one or more items in the distributed database, as described above in connection with reference number 105 of FIG. 1A. As an example, the update management device 230 may receive the set of update expressions via the client device 240 and/or via one or more applications executing in the cloud computing system 202. An update expression may indicate (or define) an update to be made to data (e.g., stored in the one or more items) in the distributed database. In some implementations, the set of update expressions may indicate respective modifications (e.g., increments or decrements) to a current value stored in a given item.

As further shown in FIG. 4, process 400 may include storing the set of update expressions in an input queue (block 420). For example, the update management device 230 (e.g., using processor 320 and/or memory 330) may store the set of update expressions in an input queue, as described above in connection with reference number 110 of FIG. 1A. As an example, prior to providing the set of update expressions to the distributed database, the update management device 230 may cause the set of update expressions to be stored or collected in the input queue (e.g., of the queue component 214).

As further shown in FIG. 4, process 400 may include aggregating, based on a value of a parameter satisfying a threshold, the set of update expressions to obtain aggerated update values for respective items of the one or more items (block 430). For example, the update management device 230 (e.g., using processor 320 and/or memory 330) may aggregate, based on a value of a parameter satisfying a threshold, the set of update expressions to obtain aggerated update values for respective items of the one or more items, as described above in connection with reference number 125 and/or reference number 130 of FIG. 1B. In some implementations, the aggregated update values are summed values indicated by update expressions, of the set of update expressions, for the respective items of the one or more items.

As further shown in FIG. 4, process 400 may include generating, for each item, an aggregated update expression that indicates an aggregated update value, of the aggerated update values, for that item (block 440). For example, the update management device 230 (e.g., using processor 320 and/or memory 330) may generate, for each item, an aggregated update expression that indicates an aggregated update value, of the aggerated update values, for that item, as described above in connection with reference number 145 of FIG. 1C. As an example, the update management device 230 may generate a single update expression (e.g., for a given item) that indicates an aggregated update value for the given item. The aggregated update value may capture or indicate updates may by multiple update expressions from the set of update expressions.

As further shown in FIG. 4, process 400 may include updating the one or more items in the distributed database using the aggregated update expression for each item (block 450). For example, the update management device 230 (e.g., using processor 320 and/or memory 330) may update the one or more items in the distributed database using the aggregated update expression for each item, as described above in connection with reference number 150, reference number 155, and/or reference number 160 of FIG. 1C. As an example, a single update expression may be provided to the distributed database to cause an item in the distributed database to be updated in accordance with an aggregated update value (e.g., which may capture or indicate updates may by multiple update expressions from the set of update expressions).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for aggregating updates for a distributed database, the system comprising:

one or more memories; and one or more processors, communicatively coupled to the one or more memories, configured to:

receive a set of input messages associated with updating one or more items in the distributed database, wherein each of the one or more items is associated with one or more attributes, wherein the distributed database is a not only structured query language (NoSQL) database, and wherein the set of input messages include respective update expressions for the distributed database;

store the set of input messages in an input queue;

aggregate, in response to a value of a batch parameter satisfying a threshold, the set of input messages to obtain aggregated update values for respective items of the one or more items, wherein the threshold is based on an amount of time included in the batch parameter, wherein the aggregated update values are summed values indicated by input messages, of the set of input messages, for the respective items of the one or more items, and wherein the one or more processors, to aggregate the set of input messages, are configured to:

identify multiple update expressions, of the respective update expressions, that indicate a same attribute, of the one or more attributes; and set a value of the same attribute as indicated by an update expression, of the multiple update expressions, that arrived at the input queue last in time;

generate, for each item, an update expression that indicates an aggregated update value for that item; and update, using the update expression for each item, the one or more items in the distributed database.

2. The system of claim 1, wherein the one or more processors, to aggregate the set of input messages, are configured to:

group the set of input messages into groups associated with respective items of the one or more items; and sum, for each group, values indicated by input messages included in that group to obtain an aggregated update value for that group.

3. The system of claim 2, wherein the one or more processors, to group the set of input messages, are configured to:

group the set of input messages using keys indicated by the respective update expressions.

4. The system of claim 1, wherein the respective update expressions are associated with an increment of a current value of the one or more items.

5. The system of claim 1, wherein the one or more processors, to update the one or more items, are configured to:

provide the update expression for each item to an output queue; and provide, from the output queue, the update expression for each item to the distributed database to cause the one or more items to be updated.

6. The system of claim 1, wherein the one or more processors, to aggregate the set of input messages, are configured to:

provide, from the input queue, the set of input messages to a serverless function that is configured to aggregate the set of input messages.

7. The system of claim 1, wherein the one or more processors, to store the set of input messages in the input queue, are configured to:

collect input messages, including the set of input messages, in the input queue until the batch parameter satisfies the threshold; and provide, from the input queue, the set of input messages to be aggregated.

8. The system of claim 1, wherein the batch parameter includes at least one of:

a quantity of the set of input messages stored in the input queue, or an amount of time that the set of input messages have been stored in the input queue.

9. The system of claim 1, wherein the update expression for each item is a single update expression for each item that indicates the aggregated update value for that item.

10. A method for aggregating updates for a distributed database, comprising:

receiving, by a device, a set of update expressions associated with updating one or more items in the distributed database, wherein each of the one or more items is associated with one or more attributes;

storing, by the device, the set of update expressions in an input queue;

aggregating, by the device and in response to a value of a parameter satisfying a threshold, the set of update expressions to obtain aggregated update values for respective items of the one or more items, wherein the threshold is based on an amount of time included in the parameter, wherein the aggregated update values are summed values indicated by update expressions, of the set of update expressions, for the respective items of the one or more items, and wherein aggregating the set of input messages comprises:

identifying multiple update expressions, of the respective update expressions, that indicate a same attribute, of the one or more attributes; and setting a value of the same attribute as indicated by an update expression, of the multiple update expressions, that arrived at the input queue last in time;

generating, by the device and for each item, an aggregated update expression that indicates an aggregated update value, of the aggregated update values, for that item; and updating, by the device, the one or more items in the distributed database using the aggregated update expression for each item.

11. The method of claim 10, wherein aggregating the set of update expressions comprises:

grouping the set of update expressions into groups associated with respective items of the one or more items; and summing, for each group, values indicated by one or more update expressions included in that group to obtain an aggregated value for that group.

12. The method of claim 10, wherein the update expressions are associated with a modification of current values of respective items of the one or more items.

13. The method of claim 10, wherein updating the one or more items comprises:

providing the aggregated update expression for each item to an output queue; and providing, from the output queue, the aggregated update expression for each item to the distributed database.

14. The method of claim 10, wherein aggregating the set of update expressions comprises:

providing, from the input queue, the set of update expressions to a Lambda function that is configured to aggregate the set of update expressions.

15. The method of claim 10, wherein the one or more items are associated with respective keys, and wherein aggregating the set of update expressions comprises:

grouping the set of update expressions into groups for the respective keys.

16. The method of claim 10, wherein the parameter includes at least one of:

a quantity of the update expressions stored in the input queue, or an amount of time that the set of update expressions have been stored in the input queue.

17. A non-transitory computer-readable medium storing a set of instructions, the set of instructions comprising:

one or more instructions that, when executed by one or more processors of a device, cause the device to:

provide, to an input queue, input messages associated with updating one or more items in a distributed database, wherein each of the one or more items is associated with one or more attributes, and wherein the input messages include respective update expressions for the distributed database;

provide, from the input queue and in response to a value of a batch parameter satisfying a threshold, a set of input messages to an aggregation component configured to obtain aggregated update values for respective items of the one or more items, wherein the threshold is based on an amount of time included in the batch parameter, and wherein the aggregation component is configured to:

identify multiple update expressions, of the respective update expressions, that indicate a same attribute, of the one or more attributes; and set a value of the same attribute as indicated by an update expression, of the multiple update expressions, that arrived at the input queue last in time;

obtain, from the aggregation component and for each item, an update expression that indicates an aggregated update value for that item; and update, using the update expression for each item, the one or more items in the distributed database.

18. The non-transitory computer-readable medium of claim 17, wherein the aggregated update values are summed values indicated by input messages, of the set of input messages, for the respective items of the one or more items.

19. The non-transitory computer-readable medium of claim 17, wherein the aggregation component is an anonymous function.

20. The non-transitory computer-readable medium of claim 17, wherein the one or more instructions, that cause the device to provide input messages, cause the device to:

collect the input messages, including the set of input messages, in the input queue, wherein the batch parameter satisfying the threshold triggers the set of input messages to be provided to the aggregation component.

* * * * *